(12) United States Patent
Ylitalo

(10) Patent No.: US 8,351,893 B2
(45) Date of Patent: *Jan. 8, 2013

(54) MOBILE STATION AND METHOD FOR PERFORMING SOFTWARE FUNCTIONS

(75) Inventor: Jouni Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 1775 days.

This patent is subject to a terminal disclaimer.

(21) Appl. No.: 10/304,776

(22) Filed: Nov. 26, 2002

(65) Prior Publication Data

US 2003/0104790 A1 Jun. 5, 2003

(30) Foreign Application Priority Data

Nov. 30, 2001 (FI) ...................................... 20012358

(51) Int. Cl.
*H04M 11/00* (2006.01)
*H04M 1/00* (2006.01)
*H04B 1/38* (2006.01)
*H04B 7/00* (2006.01)

(52) U.S. Cl. ..................... 455/404.1; 455/565; 455/411; 455/41.2

(58) Field of Classification Search .................. 455/411, 455/565, 566, 550.1, 41.2, 404.1
See application file for complete search history.

(56) References Cited

U.S. PATENT DOCUMENTS

| | | | |
|---|---|---|---|
| 4,945,556 A * | 7/1990 | Namekawa | 455/565 |
| 5,241,583 A * | 8/1993 | Martensson | 455/565 |
| 5,652,579 A | 7/1997 | Yamada et al. | |
| 5,737,394 A | 4/1998 | Anderson et al. | |
| 5,864,765 A * | 1/1999 | Barvesten | 455/565 |
| 6,085,111 A | 7/2000 | Andre | |
| 6,195,568 B1 * | 2/2001 | Irvin | 455/563 |
| 6,198,948 B1 | 3/2001 | Sudo et al. | |
| 6,208,876 B1 | 3/2001 | Raussi et al. | |
| 6,332,024 B1 | 12/2001 | Inoue et al. | |
| 6,370,362 B1 | 4/2002 | Hansen et al. | |
| 6,405,060 B1 | 6/2002 | Schroeder et al. | |
| 6,430,395 B2 * | 8/2002 | Arazi et al. | 455/41.2 |
| 6,449,496 B1 | 9/2002 | Beith et al. | |
| 6,463,304 B2 | 10/2002 | Smethers | |
| 6,571,086 B1 | 5/2003 | Uusimaki | |
| 6,574,484 B1 * | 6/2003 | Carley | 455/521 |
| 6,591,117 B1 * | 7/2003 | Kim | 455/566 |
| 6,678,534 B2 | 1/2004 | Ishigaki | |
| 6,801,765 B1 * | 10/2004 | Roo et al. | 455/411 |
| 6,892,081 B1 * | 5/2005 | Elomaa | 455/575.1 |
| 2002/0004408 A1 * | 1/2002 | Masuda et al. | 455/550 |
| 2002/0058527 A1 * | 5/2002 | Kawasaki et al. | 455/550 |
| 2002/0160807 A1 * | 10/2002 | Robertson et al. | 455/556 |

FOREIGN PATENT DOCUMENTS

| | | |
|---|---|---|
| EP | 0 453 089 A3 | 10/1991 |
| EP | 0 768 786 A2 | 4/1997 |
| EP | 0 822 695 A1 | 2/1998 |

* cited by examiner

*Primary Examiner* — Un C Cho

(74) *Attorney, Agent, or Firm* — Harrington & Smith

(57) ABSTRACT

The invention relates to a method for performing software functions in a mobile station apparatus comprising several externally accessible keys, one or more displays and means for locking the keys. The presented method comprises the steps of detecting that one or more keys are pressed down when the keypad is locked, performing software functions when said one or more keys are pressed down while the keypad is locked, and showing the result obtained after having performed software functions on one or more mobile station displays.

16 Claims, 2 Drawing Sheets

MOBILE STATION AND METHOD FOR PERFORMING SOFTWARE FUNCTIONS

FIELD

The invention relates to a mobile station apparatus and a method for performing software functions in the mobile station apparatus. The invention relates in particular to a mobile station apparatus comprising a lockable keypad.

BACKGROUND

Existing portable mobile station apparatuses comprise a user interface that includes a keypad portion comprising several keys for employing the apparatus to be used by users, for instance for selecting a telephone number or for performing other functions, like showing the telephone numbers or other data stored in the memory.

What is known from prior art portable mobile station apparatuses is the use of the locking function of the keys to prevent the apparatus from functioning when the keys are unintentionally pressed down for instance during transportation or when the user himself/herself accidentally presses the keys. Pressing down a key or keys typically locks the keys. Such a prior art locking function of the keys is described in EP publication 453089. When the locking function is switched on in the method described in said publication, the function of all other keys except for the ones releasing the locking function is prevented, and it is still possible to answer incoming calls when the locking function is switched on.

The user interfaces of mobile station apparatuses as well as the uses thereof have lately been developed and diversified to a great extent. Information that may be interesting for the users can be stored in the memory of the apparatuses. What is also possible in a prior art mobile station apparatus is to retrieve information onto the apparatus display, for example from the Internet through a WAP browser, or to receive electronic mail and text messages.

However, in prior art portable mobile station apparatuses, the method for retrieving information onto the apparatus display comprises several consecutive phases, such as using keystrokes and/or employing several menus and submenus for retrieving the desired information. To retrieve a simple piece of information, such as a date, onto the display requires several consecutive keystrokes before obtaining the desired information onto the display. When the keypad lock is switched on, the retrieval of information becomes even more difficult, as the desired information cannot be retrieved before the keypad lock is switched off.

BRIEF DESCRIPTION

It is an object of the invention to provide a method and a mobile station apparatus implementing the method so that information that is interesting for the user can be easily obtained onto the apparatus display when keeping one or more keys pressed down while the keypad lock is switched on. This is achieved with a method for performing control functions in a mobile station apparatus comprising several externally accessible keys, one or more displays and means for locking the keypad. The method of the invention comprises the steps of detecting that one or more keys are pressed down while the keypad is locked, performing software functions when said one or more keys are pressed down while the keypad is locked and showing the result obtained after having performed the software functions on one or more mobile station displays.

The invention also relates to a mobile station apparatus comprising several externally accessible keys, one or more displays and means for locking the keypad. The apparatus of the invention comprises means for detecting that said one or more keys are pressed down while the keypad is locked, means for performing software functions when one or more keys are pressed down while the keypad is locked and means for showing the result obtained after having performed the software functions on one or more mobile station displays.

The preferred embodiments of the invention are disclosed in the dependent claims.

The method and system of the invention provide several advantages. The method of the invention provides a simple and rapid way to obtain such information for use that previously required employing several consecutive keystrokes and retrieving information using menus and submenus. The method of the invention also provides such a feature that the keypad lock of the apparatus does not have to be switched off while retrieving information onto the display. The method thus enables by means of a single keystroke to read the incoming electronic mail or to check the correct date. The method of the invention also allows obtaining simply and rapidly changing data from the Internet, such as stock exchange rates or sports results. The method of the invention complements the idea of the keypad lock. The protection employed during the keypad lock can be used, and at the same time views to various applications can be provided.

BRIEF DESCRIPTION OF THE DRAWINGS

In the following the invention will be explained in more detail by means of preferred embodiments with reference to accompanying drawings, in which.

DESCRIPTION OF THE PREFERRED EMBODIMENTS

The preferred embodiments of the invention can be applied to telecommunication systems comprising one or more base stations and a number of terminals communicating with one or more base stations. In some preferred embodiments of the invention the terminals may also comprise the possibility to employ short-range communication, such as a transmitter-receiver function implemented using for example a Bluetooth chip, or an infrared or WLAN connection. The terminal may be for instance a mobile phone or another apparatus comprising corresponding telecommunication equipment, such as a portable computer.

Figure 1A:
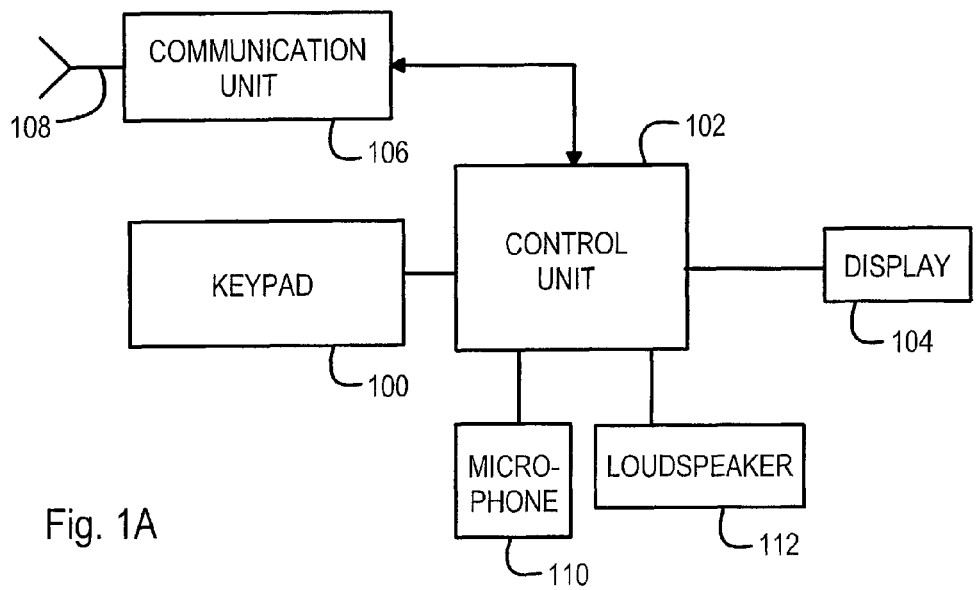
FIGS. 1A and 1B are examples showing the structures of terminals according to a preferred embodiment of the invention.

FIG. 1A is a block diagram showing the structure of a mobile station apparatus. A control unit 102 controls all the basic functions of the apparatus as well as the keypad and the display functions. Said control unit is typically implemented using a microprocessor and software or separate components. The user interface of the apparatus comprises a display 104, such as a liquid crystal display, a microphone 110, a loudspeaker 112 and a keypad portion 100. The keypad portion 100 generally comprises two kinds of keys, alphanumerical keys and function keys. Depending on the type of mobile station apparatus, different kinds and varying numbers of user interface parts exist. The mobile station apparatus also comprises means 106 for carrying out conventional mobile station apparatus functions, said means comprising speech and channel coders, modulators and RF parts. In addition, the apparatus comprises an antenna 108 that allows transmitting and receiving the communication of the apparatus.

As is common in mobile station apparatuses, the function keys include keys for establishing and ending a call and a key to access the menu of the apparatus. Desired information can be retrieved onto the mobile station display either using the specific applications of the apparatus, such as a calendar, or from remote targets, such as the Internet. When a conventional mobile station apparatus is concerned, the user has to perform several consecutive keystrokes and scroll the menus on the display, if the user wants to obtain information that may interest him/her, such as SMS (short message service) message menus or dates, onto the display.

Conventional mobile stations allow storing various setting group functions, or user profiles, into the apparatus, on the basis of which the apparatus operates in a particular way. Changing the user profile enables the user to simultaneously affect several of the settings in the apparatus. The settings, which the choice of user profile affects, are typically for instance the ringing type (normal, soundless, beep, vibration), the ringing tone, the ringing tone volume, the SMS message alert tone and the keypad tones. An example of such a user profile can for instance be such that the strength of all the tones is set at maximum level. In another user profile all other sound functions except for the reception of an SMS message are soundless.

Selecting for instance two predetermined keys in consecutive order can lock the keys of the keypad 100. In a conventional mobile station apparatus the control unit 102 identifies when said two keys are pressed down and does not therefore react when another key is pressed down before the keypad lock is switched off. However, it is possible to answer incoming calls while the keypad is switched on by pressing any key when a call arrives. Emergency calls can also be carried out when the keypad is locked.

In a preferred embodiment of the invention the control unit 102 detects, also when the keypad 100 is locked, that predetermined keys are pressed and held down, and consequently the desired software functions can be performed. Thus, desired information can be obtained for example onto the display 104. In practice, pressing down a key when the keypad is locked results in that the software in the memory of the control unit examines whether the pressing of said key is associated with performing particular software functions. If this is the case, the control unit starts performing said software functions, and as a result thereof the desired information is for example conveyed onto the display. At first, the control unit studies from where the information belonging to a particular key is to be retrieved. If the information concerned, like the calendar or SMS messages, can be found for instance from the specific applications of the apparatus, the control unit retrieves said information onto the display. If, in turn, the information to be retrieved is externally accessible from a remote place, the control unit establishes a connection to the address, where said information is located and transmits the information onto the display. In a solution according to a preferred embodiment of the invention the control unit detects that the key is no longer pressed down. When the user releases the key, the apparatus again shows the normal display of the keypad lock.

Even though the mobile station apparatus may in the present solution react, when the keys are locked, to the keystrokes by carrying out software functions, the original protective meaning of the keypad lock function does not disappear. The keypad lock is used to prevent making calls or to access applications unintentionally, for example when the keys are pressed accidentally. However, the present solution only offers views to particular applications. A preferred embodiment of the invention allows determining the software functions to be carried out so that no additional costs are caused for the user. The user may for example determine himself/herself the locations of the pages to be retrieved so that no extra costs are created for retrieving the pages. On the other hand, if the software function requires the establishment of a network connection in order to be carried out, the user may set for instance price or time limits, within which the apparatus operates. It is also possible to determine the software functions to be carried out in such a manner that each time when a key is pressed down a network connection is not established; instead the information is retrieved from a cache memory, for example.

If the apparatus receives a call at the same time as it is transmitting information onto the display, the control unit interrupts the software function and returns to the standard locking state of the keypad, in which state calls can be answered by pressing any key. However, a solution according to a preferred embodiment allows obtaining information rapidly onto the display also during a call by pressing down a key or keys and by holding the key or keys pressed down. It is thus possible to rapidly check, also during a call, for example the information required by a client without unnecessary prolonging the call or interrupting the call while retrieving the information. The solution according to a preferred embodiment of the invention the software functions can also be carried out during a packet and circuit switched connection.

Figure 1B:
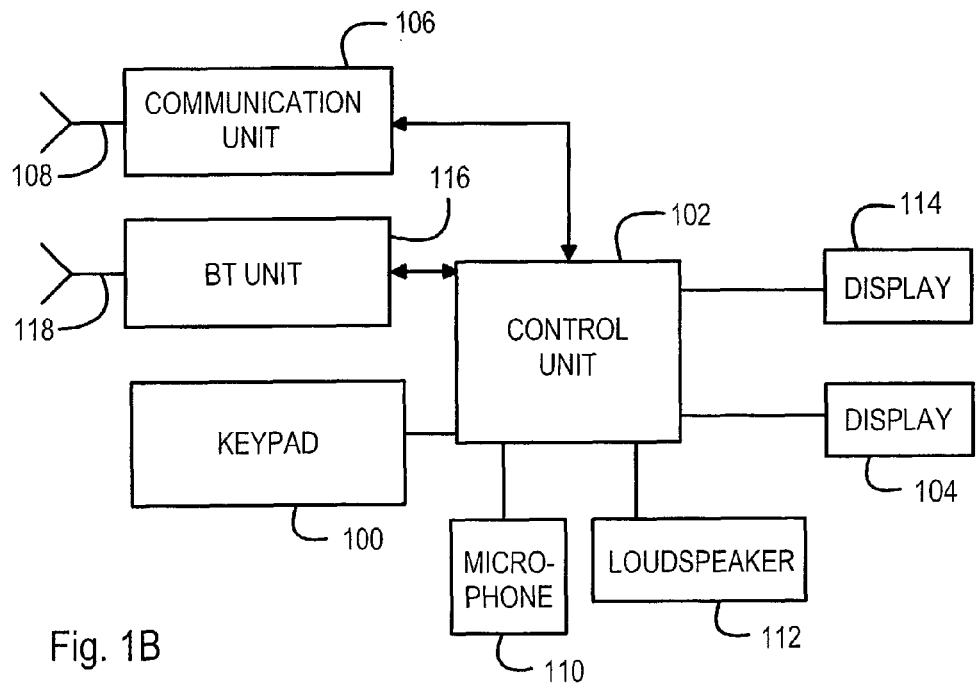

FIG. 1B is a block diagram illustrating an example of the structure of a terminal according to another preferred embodiment of the invention. A secondary display 114, such as a liquid crystal display, is added to a terminal according to FIG. 1B in addition to the primary display 104 of the apparatus according to FIG. 1A. The apparatus further comprises means 116 for implementing short-range wireless communication. In addition, the apparatus may comprise a specific antenna 118 for sending and receiving short-range communication. The means 116 can be implemented using known methods, such as a Bluetooth chip, or infrared or WLAN connections.

In the solution according to a preferred embodiment of the invention, the control unit 102 detects, while the keys are locked, that predetermined keys are pressed and held down, and consequently software functions are performed, resulting in that the desired information is obtained on either or both of the displays 104, 114. In the solution according to a preferred embodiment of the invention, the control unit 102 transmits information in accordance with the programmed functions to said key only onto the secondary display 114, for instance, and also maintains the information on said display, even though said key is released. Thus, the user may check at all times the interesting information stored in the secondary display 114. In the solution according to a preferred embodiment of the invention, a function can be programmed for a key, as a result of which a loudspeaker 112 sends a sound signal, when the control unit has transmitted the desired information onto the primary or the secondary display. While the keys are locked, the user may initiate the search controlled by the control unit for information from a desired destination by pressing down a key for a certain time, and then release said key and wait until the sound signal indicates that the information can be read from the secondary display, for example. In a preferred embodiment of the invention, the user may in addition to a sound signal select other signalling means to indicate for instance that the desired information is transmitted onto the display. Such signalling means may include for instance a physical indication, such as a vibrating alert, or a light signal, such as flickering lights on the display or the keypad.

Storing the software functions to be performed as a result of pressing down each key can be carried out using the user interface of the apparatus. The solution according to a preferred embodiment of the invention allows storing for instance the search for a calendar page for key one, the search for an Internet page for key two etc. The software functions to be performed can also be connected to form a part of the different user profiles of the apparatus defined by the user, for instance in such a manner that the information obtained as a result of performing functions belonging to a particular key in a particular user profile is transmitted for example only onto a secondary display while the sound signal indicates the arrival of the information, and in another user profile said information is transmitted onto both displays without a sound signal. In a preferred embodiment of the invention, it is possible to connect the performance of software functions to only particular user profiles in such a manner that the software functions can be performed only in particular user profiles. It is further possible to determine the software functions to be different for different user profiles.

Figure 2:
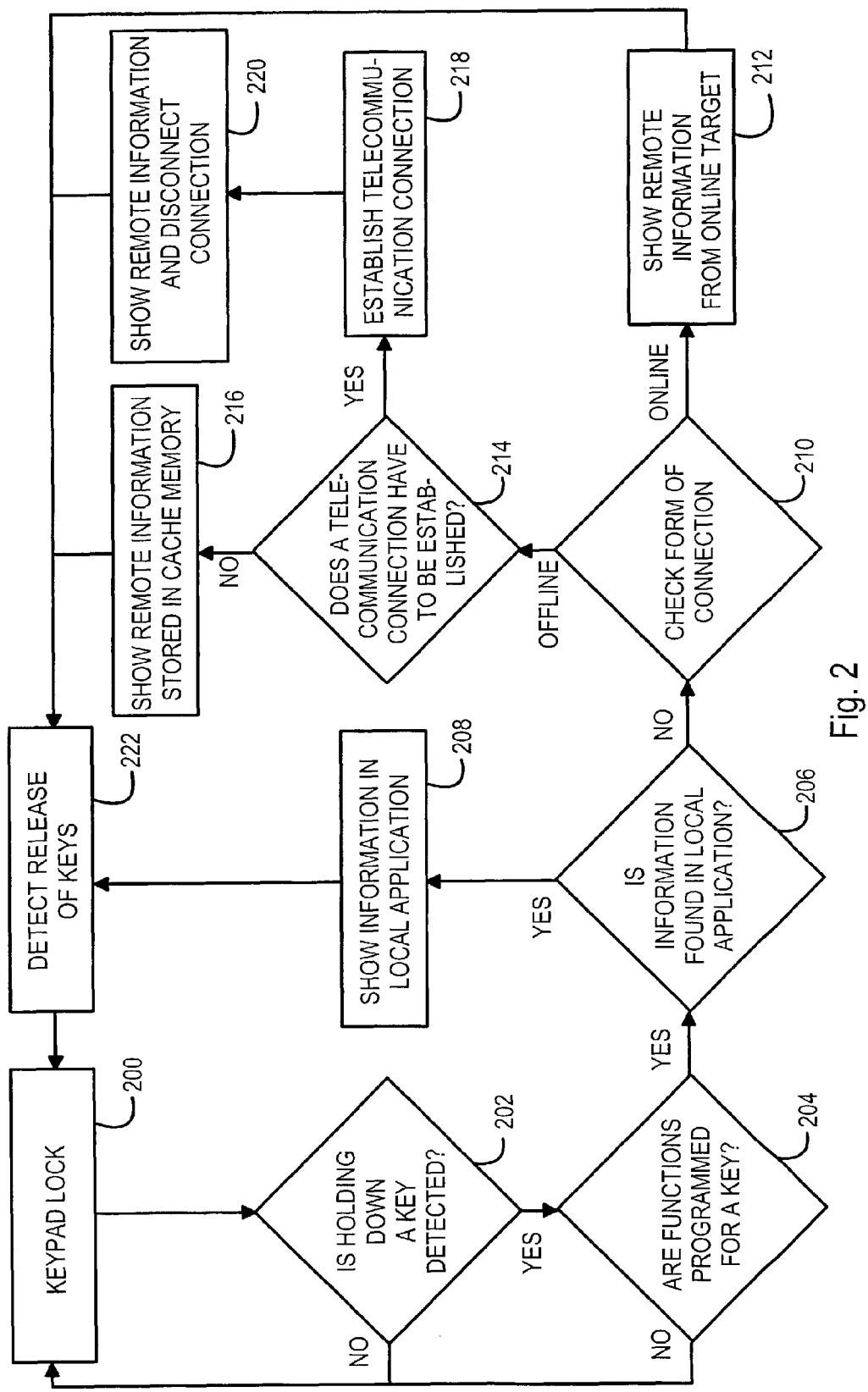
FIG. 2 is a block diagram showing an embodiment according to the invention.

Let us take a closer look at the example shown in the block diagram in FIG. 2. In step 200, the keypad lock is activated in the mobile station, whereby a symbol or text message indicating the keypad lock can be visible. In step 202, the control unit monitors the state of the keys. If a key is pressed down, the control unit detects that the key is pressed down and the process proceeds to step 204, where the control unit examines whether software functions are programmed to said key. Otherwise, when it is not detected that the keys are pressed down, then the process remains on the display of the keypad lock 200. If the control unit detects in step 204 that no software function is programmed for the key that is pressed down, the process again returns to the keypad locking state. If in turn functions are programmed for the key, the process proceeds to step 206 to examine whether the information obtained as a result of performing the software function is retrieved from the local application of the apparatus. If information retrieved from a local application is concerned, the process then proceeds to step 208, where the control unit searches for the contents of said local application and transmits the contents onto the display. Such an application may be for instance a calendar, a text message, a list of tasks, a timer, a date or another piece of local information in the mobile station. The process remains in step 208 as long as the release of the keys is detected in step 222, from where the process proceeds to the display of the keypad lock. In a preferred embodiment of the method, step 208 is also interrupted when a call arrives to the mobile station, whereby the process returns to the conventional display of the keypad lock of the mobile station, and the call can be answered by pressing any key.

If it is detected in step 206 that the desired information is not found among the specific applications of the apparatus, the process proceeds to step 210. In such a situation, where information has to be retrieved from behind telecommunication or short-range connections, said information may for instance be the contents of an e-mail message, a WWW or WAP site or a piece of information found from such a separate apparatus to which a short-range wireless connection can be established. In step 210, it is examined whether the apparatus is in online or offline state. In the online state the mobile station continuously communicates with the network, in which case the desired remote information is searched for in step 212 using transceiver means and the information is transmitted onto the display. In the offline state an operating apparatus does not constantly communicate with the network. In step 214, it is determined whether a telecommunication or short-range connection has to be established in order to retrieve the desired information.

According to an embodiment of the invention, a user may set limits concerning the establishment of connections. The user may restrict the establishment of connections by determining for example that all information is retrieved from the cache memory. Another restriction could be such that a network connection is for example established at three-hour intervals in order to update the information; otherwise the information is retrieved from the cache memory. In accordance with an embodiment of the invention the user may determine that the network connection for updating the information is established only at specific times. According to another preferred embodiment of the invention the user may also determine restrictions according to price, for instance in such a manner that when the expenses exceed a certain limit, network connections cannot thereafter be established.

In step 218, a connection is established to a target outside the apparatus using transceiver means. If remote information has to be retrieved for example from a separate apparatus from behind a short-range connection, then a connection to said apparatus can be established using for instance a Bluetooth chip, or an infrared or WLAN connection. After establishing the connection in step 220, the desired piece of information is searched for, the connection is disconnected if necessary and the retrieved information is displayed on the display. In accordance with a preferred embodiment of the invention, the user can also select whether to disconnect the connection.

If it is detected in step 214 that the search for the desired information does not require the establishment of telecommunication connections, then the process proceeds to step 216. Such a situation may be created for instance when the desired information is stored into the cache memory of the apparatus. In step 216, said information is shown from the cache memory. As in the case of step 208, the performances of steps 212, 216 and 220 are interrupted, when the release of a key is detected or when a call arrives at the apparatus, in which cases the process proceeds to the keypad locking state. If the apparatus includes a secondary display in addition to a primary display, then the information can be stored for instance in the secondary display also when a call arrives or even after the key has been released.

Even though the invention has above been explained with reference to the example in the accompanying drawings, it is obvious that the invention is not restricted thereto but can be modified in various ways within the scope of the inventive idea disclosed in the attached claims.

The invention claimed is:

1. A method comprising:
    detecting that one or more keys are kept pressed down when a keypad is locked, the one or more keys being associated with a predetermined application view containing information that is to be retrieved during keypad lock, performing software functions for retrieving the information of the predetermined application view when said one or more keys are kept pressed down while the keypad is locked,
    determining in user profiles one or more keys to correspond with particular software functions for retrieving the predetermined application view
    and showing the retrieved information of the application view on one or more mobile station displays when said one or more keys are kept pressed down while the keypad is locked.

2. The method as claimed in claim 1, further comprising detecting that one or more keys are pressed down when the keypad is locked, when said one or more keys are pressed down for a predetermined continuous period of time.

3. The method as claimed in claim 1, further comprising performing signalling when the retrieved application view is loaded onto one or more displays.

4. The method as claimed in claim 1, further comprising maintaining the application view on said one or more displays while one or more keys are pressed down.

5. The method as claimed in claim 1, further comprising maintaining the application view on said one or more displays until other information is retrieved onto said one or more displays.

6. The method as claimed in claim 1, further comprising interrupting the performance of software functions for retrieving the predetermined application view when a call arrives at the mobile station apparatus.

7. The method as claimed in claim 1, further comprising performing software functions for retrieving the predetermined application view after having answered a call and during a call.

8. The method as claimed in claim 1, further comprising performing software functions for retrieving the predetermined application view during data transmission.

9. The method as claimed in claim 1, wherein the software functions for retrieving the predetermined application view corresponding to one or more keys determined in the user profiles vary in the different user profiles.

10. The method as claimed in claim 1, wherein the application view is obtained after performing software functions and comprises information included in application programs of the apparatus.

11. The method as claimed in claim 1, wherein the performance of software functions for retrieving the predetermined application view comprises an establishment of a telecommunication connection or a short-range wireless connection.

12. The method as claimed in claim 1, wherein the application view is obtained after performing software functions and comprises information obtained from a remote destination behind a telecommunication connection or a short-range wireless connection.

13. A method comprising:
detecting that one or more externally accessible keys are kept pressed down when a keypad of an apparatus is locked, the one or more keys being associated with pre-determined information that is to be retrieved during keypad lock,
performing software functions for retrieving the predetermined information when said one or more keys are kept pressed down while the keypad is locked including establishing a telecommunication connection or a short-range wireless connection wherein the communication connection comprises an Internet connection, and
showing the information obtained after having performed software functions for retrieving the predetermined information on one or more mobile station displays of the apparatus.

14. A method comprising:
detecting that one or more externally accessible keys are kept pressed down when a keypad of an apparatus is locked, the one or more keys being associated with pre-determined information that is to be retrieved during keypad lock,
performing software functions for retrieving the predetermined information when said one or more keys are kept pressed down while the keypad is locked including establishing a telecommunication connection or a short-range wireless connection wherein the short-range wireless connection comprises a Bluetooth, or an infrared or WLAN connection, and
showing the information obtained after having performed software functions for retrieving the predetermined information on one or more displays of the apparatus.

15. A method comprising:
detecting that one or more externally accessible keys are kept pressed down when a keypad of an apparatus is locked, the one or more keys being associated with pre-determined information that is to be retrieved during keypad lock,
performing software functions for retrieving the predetermined information when said one or more keys are kept pressed down while the keypad is locked, and
showing the information obtained after having performed software functions for retrieving the predetermined information on one or more displays of the apparatus wherein the information includes information obtained from a remote destination behind a telecommunication connection or a short-range wireless connection wherein the communication connection comprises an Internet connection.

16. A method comprising:
detecting that one or more externally accessible keys are kept pressed down when a keypad of an apparatus is locked, the one or more keys being associated with pre-determined information that is to be retrieved during keypad lock,
performing software functions for retrieving the predetermined information when said one or more keys are kept pressed down while the keypad is locked, and
showing the information obtained after having performed software functions for retrieving the predetermined information on one or more displays of the apparatus wherein the information includes information obtained from a remote destination behind a telecommunication connection or a short-range wireless connection wherein the short-range wireless connection comprises a Bluetooth, or an infrared or WLAN connection.

* * * * *